(No Model.) 5 Sheets—Sheet 1.
H. W. LEONARD.
SYSTEM OF ELECTRICAL DISTRIBUTION.
No. 478,344. Patented July 5, 1892.
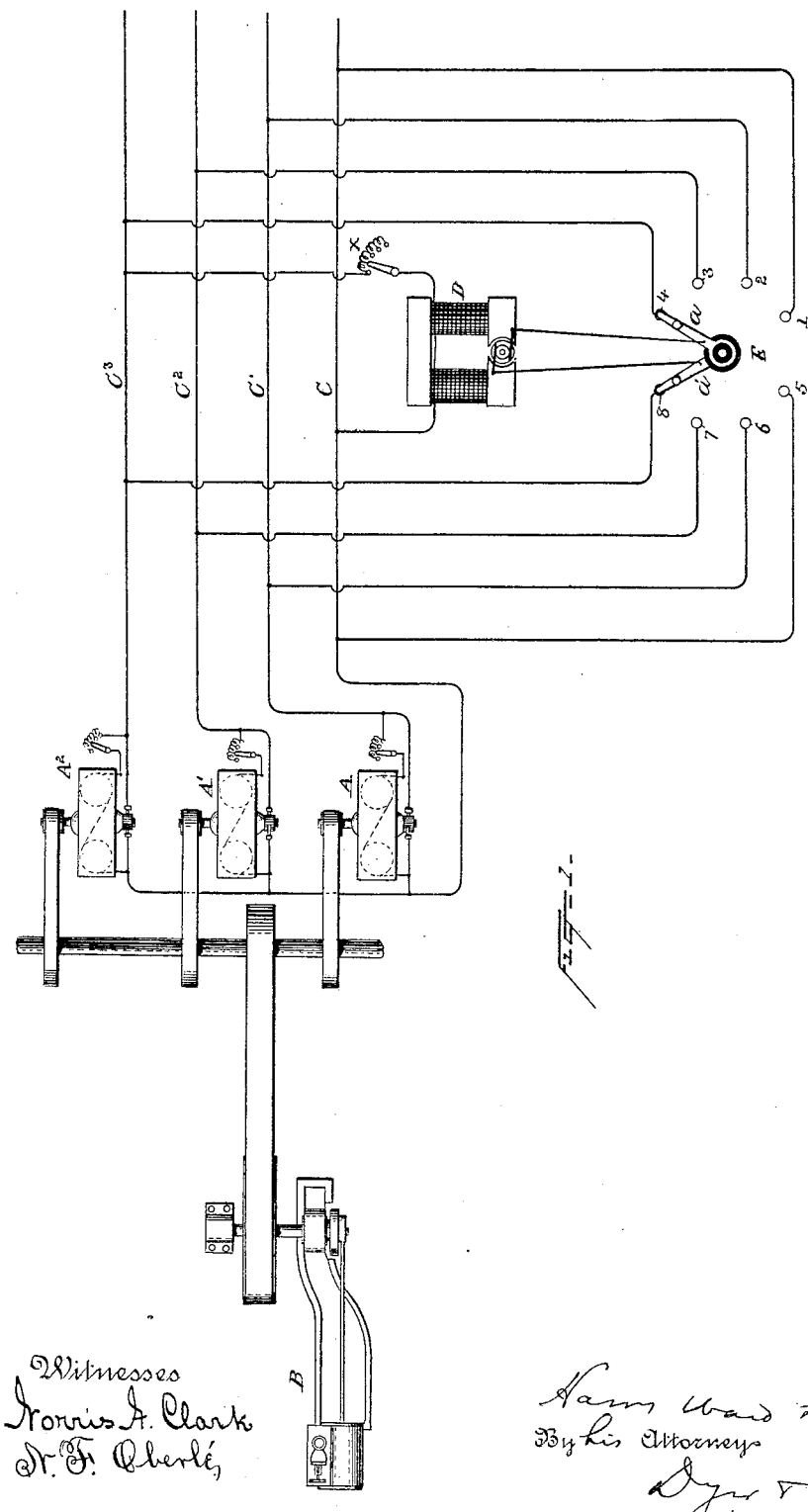

(No Model.)
5 Sheets—Sheet 2.
H. W. LEONARD.
SYSTEM OF ELECTRICAL DISTRIBUTION.
No. 478,344.  Patented July 5, 1892.
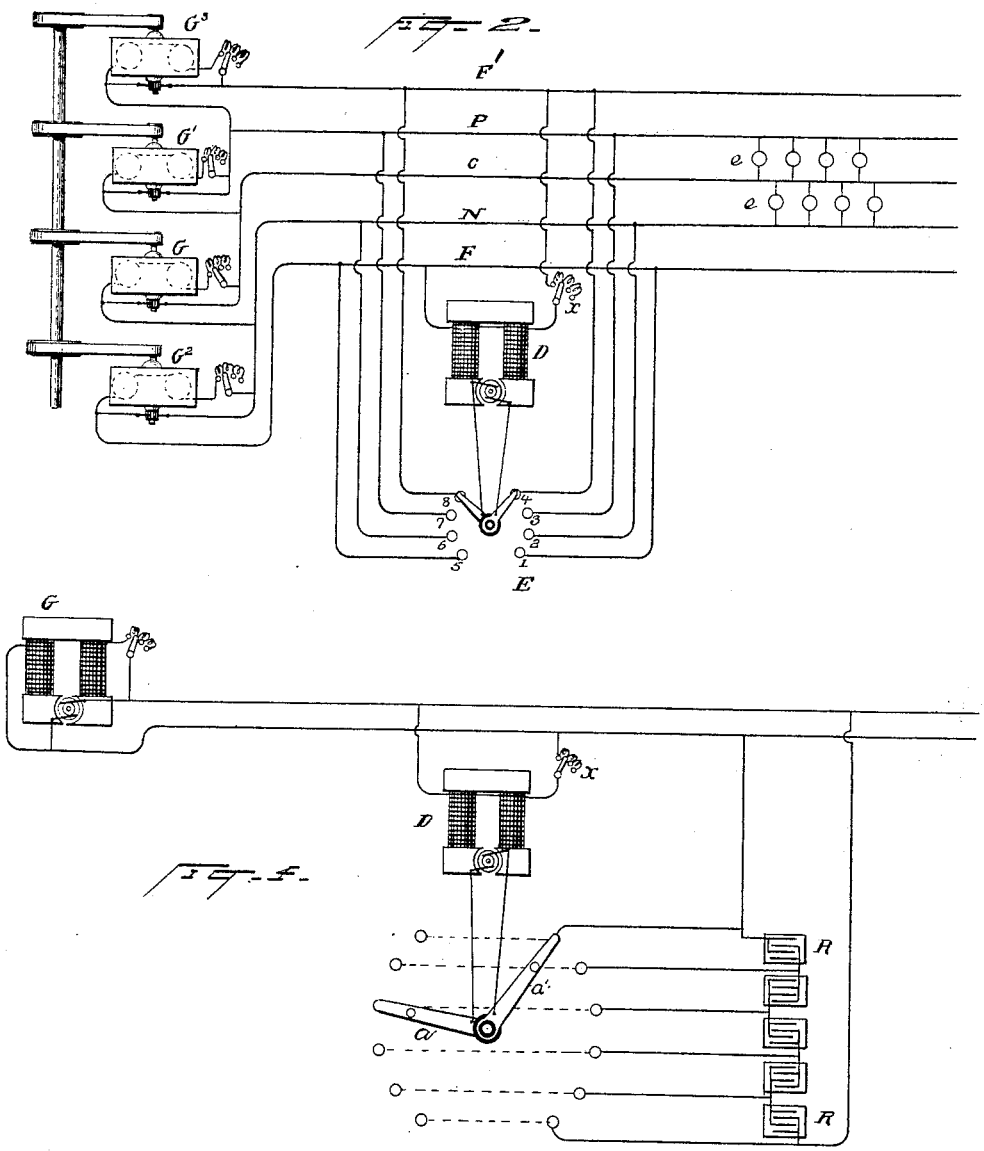

(No Model.)  5 Sheets—Sheet 3.
H. W. LEONARD.
SYSTEM OF ELECTRICAL DISTRIBUTION.
No. 478,344. Patented July 5, 1892.
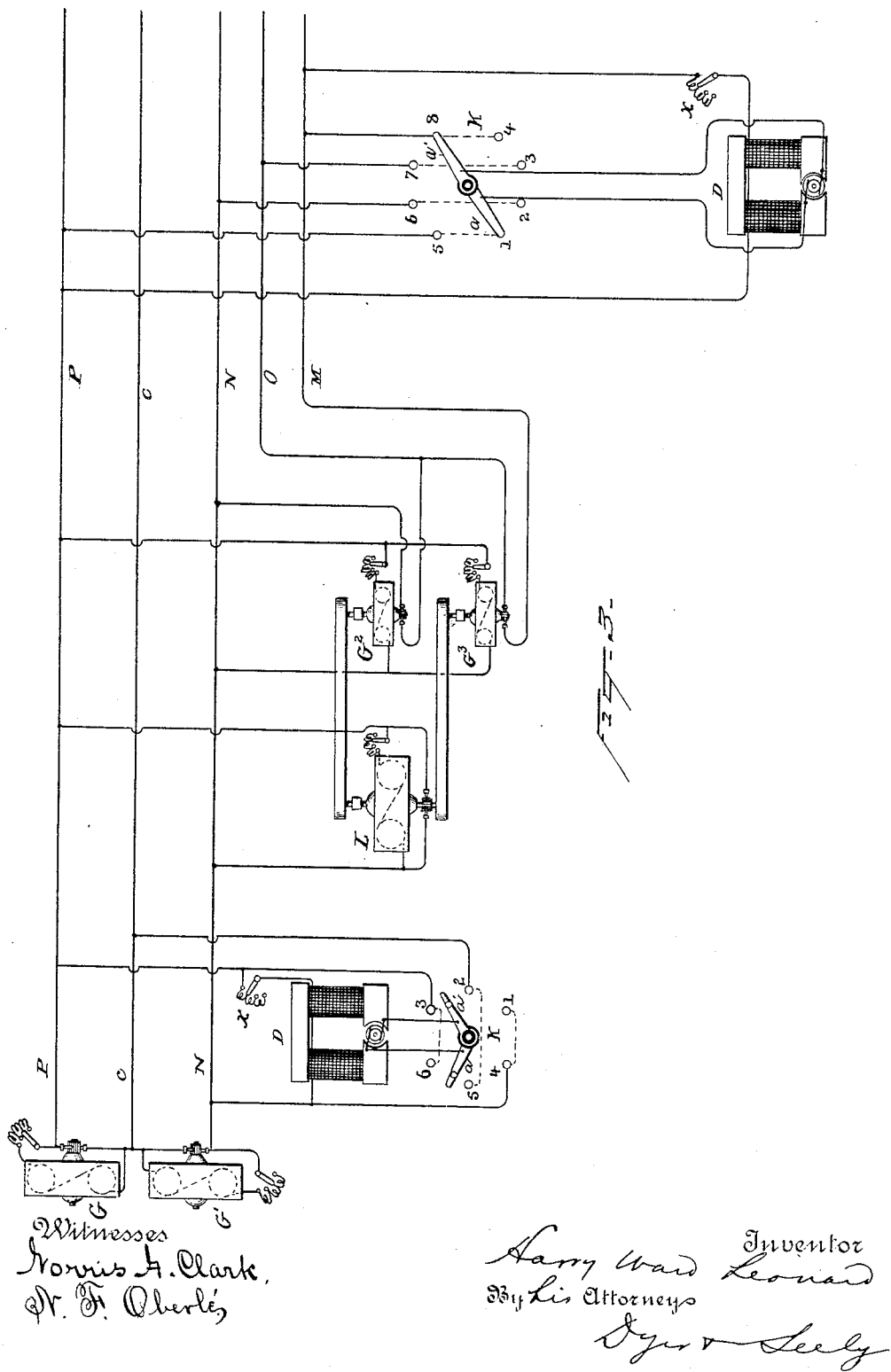

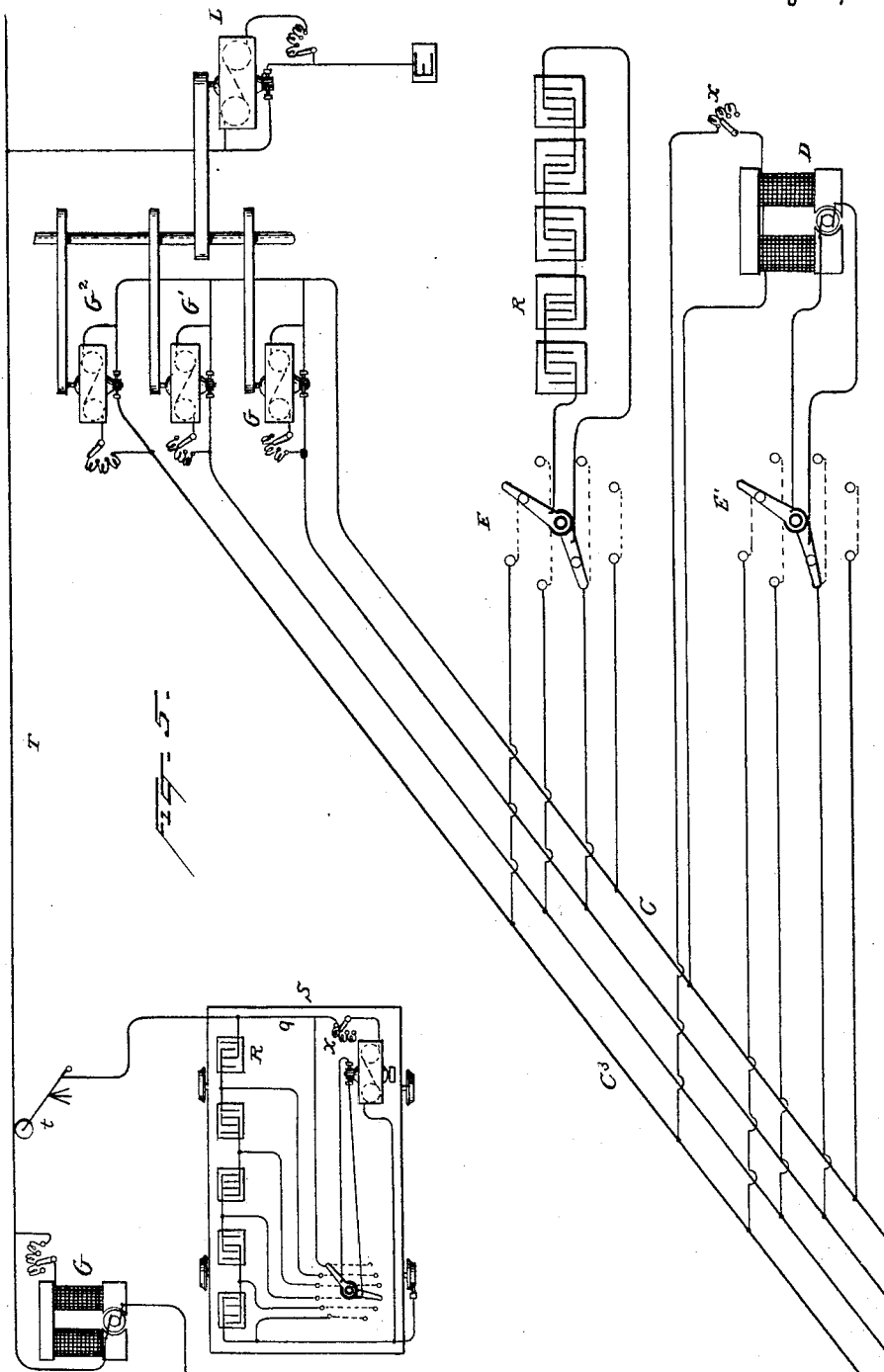

(No Model.)  5 Sheets—Sheet 5.
H. W. LEONARD.
SYSTEM OF ELECTRICAL DISTRIBUTION.
No. 478,344.  Patented July 5, 1892.
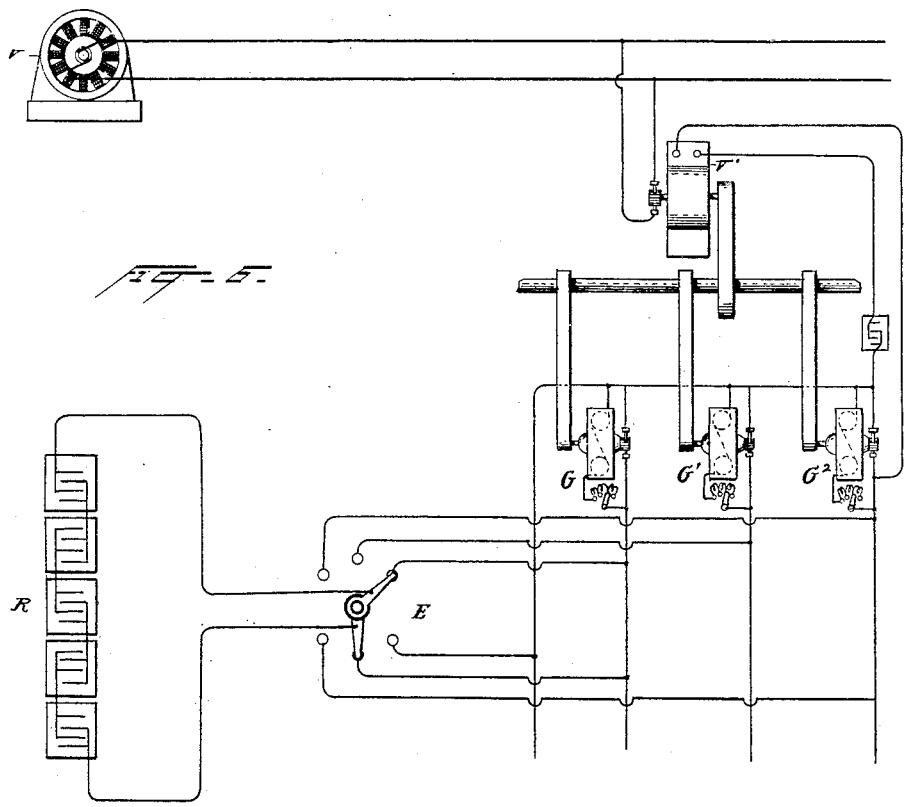

UNITED STATES PATENT OFFICE.

HARRY WARD LEONARD, OF NEW YORK, N. Y.

SYSTEM OF ELECTRICAL DISTRIBUTION.

SPECIFICATION forming part of Letters Patent No. 478,344, dated July 5, 1892.

Application filed November 27, 1891. Serial No. 413,287. (No model.)

*To all whom it may concern:*

Be it known that I, HARRY WARD LEONARD, of New York city, in the county and State of New York, have invented a certain new and useful Improvement in Systems of Electrical Distribution, of which the following is a specification.

My invention relates in part to the operation and regulation of electric motors. In my application filed August 14, 1891, Serial No. 402,651, I have set forth a method of operating electric motors at any speed or any torque desired and at the same efficiency under all conditions, such method consisting, generally, in maintaining the field-magnet of the motor at a constant strength and varying the volts on the armature-circuit to vary the speed and the ampères on such circuit to vary the torque.

One object of my present invention is to enable this method to be carried out without varying the electro-motive force of the generator which forms the source of supply for the system of conductors with which the motor-armature is connected and also without the necessity of employing an intermediate motor and generator as was the case in the application referred to, when the motor was supplied from a system of conductors of constant electro-motive force. I thus avoid the loss due to the successive transformations of energy and also save the cost of the intermediate transforming devices. To accomplish this, I make use of a system of distribution in which there are three or more conductors, between each of the different pairs of which are maintained different electro-motive forces and I so arrange the motor and suitable switching or connecting devices that the motor-armature may be connected between the different pairs of conductors, whereby two or more different electro-motive forces are obtained at its armature-terminals, the field-magnet of the motor being so arranged and connected as to be maintained at a constant strength. Preferably the arrangement of the motor-armature, the conductors, and the connecting devices is such that the direction of rotation of the armature may be reversed by changing the manner of its connection with the supplying-conductors.

In the preferred arrangement of the system there are provided two or more generators of different constant electro-motive forces having like poles connected to a common conductor of the system, and each having an independent conductor extending from its other pole, said generators being run from a common prime motor or source of power. In this case the armature of a motor operated by the system is arranged to be connected between either independent conductor and the common conductor, so as to receive the electro-motive force of either generator by itself or between the independent conductors of different generators, in which case it receives an electro-motive force equal to the difference of the electro-motive forces of two generators, the weaker generator then running as a motor and assisting the prime motor to operate the stronger generator. This arrangement of conductors and generators is not the only one, however, by which that portion of my invention which relates to the operation and regulation of electric motors may be carried into effect, for similar results may be obtained by the modified arrangements, as will be presently explained.

The use of the preferred arrangement just generally described is, moreover, not confined to the operation of electric motors or to translating devices at whose terminals it is desired to alter the electro-motive force, for, as will be hereinafter explained, such a system furnishes useful results when used in connection with incandescent electric lamps or other translating devices without the provision of switching or circuit-changing devices, and such a system or arrangement forms a feature of my invention independent of the matter of operating and regulating electric motors.

In addition to the features of invention thus generally set forth my invention consists in the various novel devices and combinations of devices and methods of operation more specifically hereinafter set forth, and pointed out in the claims.

My invention is illustrated in the accompanying drawings.

Figure 1 is a diagram of a simple system embodying the preferred form of my invention as applied to the operation and regulation of an electric motor; Fig. 2, a diagram showing an application of my invention as an addition to the three-wire system; Fig. 3, a diagram showing other modes of application to the three-wire system; Fig. 4, a diagram of an arrangement in which the motor-armature is supplied by secondary batteries. Figs. 5 and 6 are diagrams showing several different applications of my invention. Figs. 7 and 8 show the use of the preferred form of my invention with constant-potential translating devices.

Referring first to Fig. 1, A, A', and $A^2$ are three dynamo-electric machines of constant difference of potential, all run by the same engine or prime motor B. The three dynamos have their like terminals connected to a common conductor C, while each has its other terminal connected to an independent conductor C', $C^2$, or $C^3$. These three generators are preferably constructed so that each has a different electro-motive force. For instance, A may be of 62.5 volts, A' of one hundred and eighty-seven, and $A^2$ of four hundred and thirty-seven volts. D is an electric motor whose field-magnet is wound for the full difference of potential of four hundred and thirty-seven volts and is connected between conductors C and $C^3$, so that it receives a practically-constant electro-motive force and is maintained at practically a constant strength. It is evident, however, that the field-magnet may be wound for and connected between the common conductor and any one of the other conductors. The armature-terminals of the motor are connected, respectively, with the arms $a$ $a'$ of a switch E, which arms are insulated from each other and are movable independently. Arm $a$ moves over the four contact-blocks 1 2 3 4, which are electrically connected, respectively, with the four conductors C, C', $C^2$, and $C^3$. Arm $a'$ moves over contacts 5 6 7 8, connected, respectively, with the same conductors. It will be seen that in the position of the switch-arms shown there is no difference of potential at the motor-terminals, both being in connection with conductor $C^3$; but by moving the switch-arms upon the contact-blocks various differences of potential may be obtained. Thus, if the armature is connected between C and C'—that is, with the switch arms on blocks 2 and 5 or 6 and 1—the armature will receive only the 62.5 volts of generator A. If between C and $C^2$—that is, blocks 5 and 3 or 1 and 7—there is obtained the one hundred and eighty-seven volts of generator A'; or, if between C and $C^3$ (blocks 5 and 4 or 1 and 8,) there is obtained the electro-motive force of $A^2$, or four hundred and thirty-seven volts. Connecting between C' and $C^2$ (blocks 6 and 3 or 2 and 7) gives the difference between A and A', or one hundred and twenty-five volts. Between $C^2$ and $C^3$ is the difference between A' and $A^2$, or two hundred and fifty volts; or between C' and $C^3$ gives $437 - 62.5 = 375$ volts. I am thus enabled to obtain by the manipulation of the switch any one of the following voltages at the motor-armature terminals—viz., 62.5, one hundred and twenty-five, one hundred and eighty-seven, two hundred and fifty, three hundred and seventy-five, or four hundred and thirty-seven volts, and each of these may be obtained in either direction, so that the motor may be reversed and run in either direction at any one of the different speeds which are attainable by these variations of electro-motive force.

It will be understood that when the electro-motive force of one generator is opposed to that of the other the weaker generator is run as a motor and assists the prime motor in the operation of the other generator.

In Fig. 2, G and G' represent the generators of a three-wire system having positive conductor P, negative N, and neutral $c$, supplying electric lamps or other translating devices $e\ e$, which system may be considered as one already established and to which it is desired to apply my invention for the purpose of operating electric motors or other translating devices at whose terminals it is desired to vary the difference of potential. To this end I provide two additional generators $G^2$ and $G^3$, placed in series with G and G', and two additional conductors F and F', extending from the outer terminals of the series of generators. The motor D has its field-magnet connected across these two outer conductors. Its armature terminals are connected with the arms of a switch E, similar to that already described. The blocks 1 2 3 4 of the switch are connected, respectively, with conductors F, N, P, and F', and blocks 5 6 7 8 are joined, respectively, to the same conductors. It will be seen that by moving the switch-arms so as to connect the motor to different pairs of conductors the difference of potential of the whole series of generators or of any part thereof may be supplied to the motor-armature. Thus, if the dynamos are of one hundred volts each, either four hundred, three hundred, two hundred, or one hundred volts may be obtained at the motor-armature and each of these in either direction, while the three-wire system is not in any wise affected, there being no connection from the motor to the neutral wire and the generators G G' and lamps $e\ e$ operating in precisely the same manner as before.

My invention may, however, be applied to the three-wire system without making any additions to the main conductors thereof, as shown in Fig. 3. G G' are the dynamos and P N $c$ the main conductors of the system. The motor D (shown at the left of the figure) is shown with its field-magnet connected between conductors P N, or it may be otherwise connected so as to remain practically constant. The armature-terminals are connected with independently-movable arms $a$ $a'$ of a switch K. The switch K has its contacts 3 and 6 both connected with the conductor P, its contacts 2 and 5 both connected with the neutral wire $c$, and its contacts 1 and 4 both connected with conductor N. It will be seen that by means of this switch and by moving the independently-movable arms $a$ $a'$ thereof the armature of the motor D may be connected either between the two main conductors P N or between one of said conductors and the neutral wire $c$, whereby the motor may be made to run at either of two different speeds and in either direction at either speed. Such an arrangement is suitable for such uses of electric motors as require only two constant speeds for the motor. A different arrangement is shown at the right-hand end of Fig. 3. An electric motor L has its armature and its field-magnet connected in shunt relation between two conductors P N of the three-wire system. Said motor is connected by belts or otherwise with the armature-shafts of two dynamo-electric machines $G^2$ $G^3$. These machines are joined in series between the conductor N of the three-wire system and an additional conductor M. From between the two machines there extends another extra conductor O. In order to enable a greater number of variations of speed to be obtained the generators $G^2$ and $G^3$ may be made to have different electro-motive forces. The working-motor D preferably has its field-magnet connected between the two outer conductors P and M, so as to receive a constant electro-motive force equal to the total of the machines G, G', $G^2$, and $G^3$. The switch K has its contacts 1 and 5 connected with the conductor P, its contacts 2 and 6 with conductor N, 3 and 7 with conductor O, and 4 and 8 with conductor M. Assuming that the generators G and G' have each one hundred volts electro-motive force, the generator $G^2$ to have one hundred and fifty volts, and $G^3$ two hundred volts, then by moving the arms $a$ $a'$, which are connected with the armature-terminals of the motor B, differences of potential of five hundred and fifty, three hundred and fifty, two hundred, or one hundred and fifty volts may be obtained at such armature-terminals, the field remaining constant. Such a plant, consisting of the motor L, generators $G^2$ $G^3$, and conductors O M, may be installed in a factory or other place supplied by a three-wire distribution system for the purpose of operating motors in such place without affecting the operation of the distribution system.

It will be seen that the arrangements of Figs. 2 and 3 do not embody what I have described as the preferred arrangement of generators and conductors, the object of these arrangements being to enable electric motors to be regulated in accordance with my invention when used in connection with three-wire systems already installed without affecting the normal operation of such systems.

Fig. 4 shows the operation of an electric motor in accordance with my invention in connection with secondary batteries interposed between the prime generator and the operating motor. G is a dynamo-electric machine, and R R are secondary batteries charged thereby. The motor D has its field-magnet supplied from the circuit of the generator G. The series of cells R is divided into groups, from between which conductors extend to the contact-plates of a switch, similar to those described in connection with Fig. 3, each conductor extending from the storage-battery being connected with two contacts on opposite sides of the switch, whose independently-movable arms $a$ $a'$ are connected, respectively, with the armature-terminals of the motor D. It will be readily seen that by moving the said arms $a$ $a'$ upon the switch contacts the motor-armature becomes connected with circuits having different electro-motive forces supplied to them, whereby the speed of the motor is varied without affecting its field-magnet strength, and by properly adjusting the switch-arms the direction of rotation of the motor-armature will be reversed, so that it may run at any of its speeds in either direction.

In Fig. 5, T represents the overhead trolley-wire of an electric railway supplied by generator G, whose opposite terminals are connected with the earth. $t$ is the trolley of the car S, and in the circuit between the trolley and the ground are storage-batteries R, which supply the motor D, which propels the car. The connection between the motor D and the storage-cells R is through a switch, similar to that in Fig. 4, so that the speed of the motor may be varied and the direction of its revolution reversed at any speed. In order to make the field-magnet of the motor independent of these variations it is connected with the line outside of the storage-battery terminals.

At the right-hand end of Fig. 5 is shown an arrangement for doing stationary work by energy received from the power-line T in accordance with my invention. The intermediate motor L is connected directly between the conductor T and the earth, its field-magnet being in a shunt to its armature. The motor L is caused to rotate the armatures of three dynamo-electric machines G, G', and $G^2$, the arrangement of these dynamos being the same as in Fig. 1. R represents storage-cells charged at different electro-motive forces by adjusting the switch E, so as to connect the cells in different ways to the conductors extending from the generators, as has been fully described in connection with Fig. 1. The speed of the motor D is varied in the same way by the adjustment of the switch E', the field-magnet of the said motor being connected across the two outer conductors C $C^3$, or between any pair of conductors having a constant difference of potential.

In Fig. 6 the main source of supply is an alternating-current dynamo-electric machine V, whose armature-circuit extends to the armature of a similar machine V', which is thereby run as a motor in synchronism with the revolution of the generator. The alternating-current motor V' is caused to operate the three continuous-current generators G, G', and $G^2$, arranged and connected, as in Figs. 1 and 5, and which may be employed in the manner set forth in connection with those figures. I have shown them as used to charge storage-batteries R at different electro-motive forces through the medium of the switch E. A shunt-circuit from the generator $G^2$ may be used to excite the field of the motor $V'$, as shown, a secondary battery being included in the circuit to enable generator $G^2$ to start up as a motor and raise the motor $V'$ to synchronism with generator V.

In all these figures in which I have shown a working motor having its field-magnet supplied from a constant source I have shown an adjustable resistance $x$ in the field-circuit of the motor. Such resistance may be used where it is desired to produce greater niceties of adjustment of speed than by the method which constitutes my invention, the resistance forming an additional means of regulation. The main regulation of the speed, however, by connecting the armature-terminals to the different conductors having different potentials, is accomplished without any change in the strength of the field-magnet, so that the same is practically constant.

What I claim is—

1. The herein-described method of changing the speed of an electric motor, which consists in maintaining upon each one of three or more conductors a potential different from that which is maintained on any other one of the conductors and connecting the armature-terminals of the motor with different pairs of said conductors, substantially as set forth.

2. The herein-described method of varying the speed of an electric motor, which consists in maintaining its field-magnet at a constant strength and connecting its armature terminals with one or another of two or more constant potential sources, the potentials of which are different.

3. The combination of two or more conductors, on each of which is maintained a potential different from that which is maintained on a common return-conductor, an electric motor, and switching devices whereby the motor may be connected between different pairs of said conductors, substantially as set forth.

4. The combination of three or more conductors, between every two of which is maintained a difference of potential different from that which is maintained between every other two, an electric motor, and switching devices whereby the motor may be connected between different pairs of said conductors, substantially as set forth.

5. The combination of two or more generators of different electro-motive forces, three or more conductors, said generators all having their like poles connected to one of said conductors and each having its other pole connected to one of the other conductors, an electric motor, and switching devices for connecting said motor between different pairs of said conductors, substantially as set forth.

6. The combination of two or more generators of different electro-motive forces, three or more conductors, said generators all having their like poles connected to one of said conductors and each having its other pole connected to one of the other conductors, an electric motor having a constant field-magnet, and switching devices for connecting the armature of said motor between different pairs of said conductors, substantially as set forth.

7. The combination of two or more generators of different electro-motive forces, three or more conductors, said generators all having their like poles connected to one of said conductors and each having its other pole connected to one of the other conductors, an electric motor having its field-magnet connected between a pair of said conductors having a constant difference of potential, and switching devices for connecting the armature of said motor between different pairs of said conductors, substantially as set forth.

8. The combination, in a system of electrical distribution, of three or more conductors, each having a constant potential, and there being a different electro-motive force or difference of potential between each two conductors of the system, a translating device, requiring in its operation different electromotive forces, and switching devices for connecting said translating device between different pairs of said conductors, substantially as set forth.

9. The combination, with three or more conductors, between every two of which is maintained a difference of potential or electro-motive force different from that which is maintained between every other two, of an electric motor, and switching devices whereby the terminals of said motor may be connected between different pairs of said conductors and their connection with any pair may be reversed, substantially as set forth.

This specification signed and witnessed this 24th day November, 1891.

HARRY WARD LEONARD.

Witnesses:
   W. PELZER,
   H. J. WESTOVER.